(12) United States Patent
Kikuchi

(10) Patent No.: US 11,631,545 B2
(45) Date of Patent: Apr. 18, 2023

(54) FILM CAPACITOR, COMBINATION TYPE CAPACITOR, AND INVERTER AND ELECTRIC VEHICLE EMPLOYING THE SAME

(71) Applicant: KYOCERA Corporation, Kyoto (JP)

(72) Inventor: Naoki Kikuchi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 336 days.

(21) Appl. No.: 16/755,682

(22) PCT Filed: Oct. 24, 2018

(86) PCT No.: PCT/JP2018/039498
§ 371 (c)(1),
(2) Date: Apr. 13, 2020

(87) PCT Pub. No.: WO2019/082929
PCT Pub. Date: May 2, 2019

(65) Prior Publication Data
US 2021/0193393 A1    Jun. 24, 2021

(30) Foreign Application Priority Data
Oct. 27, 2017  (JP) .............................. JP2017-208290

(51) Int. Cl.
*H01G 4/33*   (2006.01)
*H01G 4/012*  (2006.01)
(Continued)

(52) U.S. Cl.
CPC .............. *H01G 4/33* (2013.01); *H01G 4/012* (2013.01); *H01G 4/015* (2013.01); *H01G 4/228* (2013.01); *H01G 4/32* (2013.01); *H01G 4/385* (2013.01)

(58) Field of Classification Search
CPC ............ H01G 4/33; H01G 4/32; H01G 4/012; H01G 4/228; H01G 4/385; H01G 4/005; H10G 4/015
(Continued)

(56) References Cited

U.S. PATENT DOCUMENTS 4,494,168 A * 1/1985 Kume ..................... H01G 4/32
                                                                361/273
4,694,377 A * 9/1987 MacDougall ............ H01G 2/14
                                                              361/275.1
(Continued)

FOREIGN PATENT DOCUMENTS

EP          2779187 A1    9/2014
JP       2005-085870 A    3/2005
(Continued)

*Primary Examiner* — Arun Ramaswamy
(74) *Attorney, Agent, or Firm* — Volpe Koenig

(57) ABSTRACT

A film capacitor includes: a main body portion including a first metallized film including a first metal film on a first face of a first dielectric film, and a second metallized film including a second metal film on a second face of a second dielectric film; and external electrodes. The first or second dielectric film is located between the first and second metal films. The external electrodes are disposed on main body ends so as to be electrically connected with the first or second metal film. At least one of the first and second metal films includes a first portion which has a film thickness of 20 nm or more and is located in proximity to the main body ends, and the first portion includes a first groove extending in the first direction and being in contact with corresponding one of the main body ends.

13 Claims, 7 Drawing Sheets

(51) Int. Cl.
*H01G 4/015* (2006.01)
*H01G 4/228* (2006.01)
*H01G 4/32* (2006.01)
*H01G 4/38* (2006.01)

(58) Field of Classification Search
USPC ............... 361/303, 301.5, 328, 321.2, 301.4; 318/139
See application file for complete search history.

(56) References Cited

U.S. PATENT DOCUMENTS

| | | | | |
|---|---|---|---|---|
| 4,719,537 A | * | 1/1988 | Gizolme | H01G 4/015 361/273 |
| 5,696,663 A | * | 12/1997 | Unami | H01G 4/015 361/309 |
| 6,040,038 A | * | 3/2000 | Momose | H01G 4/015 428/209 |
| 2006/0050467 A1 | * | 3/2006 | Shiota | H01G 4/252 361/303 |

FOREIGN PATENT DOCUMENTS

| | | | |
|---|---|---|---|
| JP | 2008-270331 A | 11/2008 | |
| JP | 2013-219094 A | 10/2013 | |
| JP | 2015-177172 A | 10/2015 | |
| WO | WO-2017159672 A1 * | 9/2017 | ............. H01G 4/012 |

* cited by examiner

_US 11,631,545 B2_

FILM CAPACITOR, COMBINATION TYPE CAPACITOR, AND INVERTER AND ELECTRIC VEHICLE EMPLOYING THE SAME

CROSS-REFERENCE TO RELATED APPLICATIONS

This application is a national stage entry according to 35 U.S.C. 371 of International Application No. PCT/JP2018/039498, filed on Oct. 24, 2018, which claims priority to Japanese Patent Application No. 2017-208290, filed on Oct. 27, 2017, the contents of which are entirely incorporated herein by reference.

TECHNICAL FIELD

The present disclosure relates to a film capacitor, a combination type capacitor, and an inverter and an electric vehicle employing the capacitor.

BACKGROUND

For example, a film capacitor includes a dielectric film made of polypropylene resin in film-like form, and a metal film formed on a surface of the dielectric film by vapor deposition. The metal film is used as an electrode. In the film capacitor thus constructed, in the event of electrical short-circuiting occurring at an insulation defect point in the dielectric film, the metal film lying around the defect point is volatilized for release by short-circuiting-induced energy, with the consequent attainment of insulation in the insulation defect point of the dielectric film. The film capacitor having such a self-healing capability is resistant to dielectric breakdown.

With its resistance to troubles such as ignition or electric shock that arise due to electrical short-circuiting occurring in an electric circuit, the film capacitor has recently been put to an increasingly wider range of uses, including application to a power circuit for LED (Light Emitting Diode) illumination, etc., application to motorized drive for a hybrid car, and application to an inverter system for photovoltaic power generation.

For example, Japanese Unexamined Patent Publication JP-A 2005-085870 (Patent Literature 1) discloses a technology for increasing the strength of connection between a metal film and an external electrode that constitute a film capacitor by designing the metal film such that a metal film portion connected to the external electrode is greater in thickness than a portion of the metal film within a capacitance generation section having such a self-healing capability as described above.

SUMMARY

A film capacitor according to the disclosure includes: a main body portion including at least, a first metallized film including a first dielectric film and a first metal film disposed on a first face of the first dielectric film, and a second metallized film including a second dielectric film and a second metal film disposed on a second face of the second dielectric film; and a pair of external electrodes. The first dielectric film or the second dielectric film is disposed between the first metal film and the second metal film. The external electrodes are disposed on a pair of main body ends in a first direction of the main body portion so as to be electrically connected with the first metal film or the second metal film. The first metal film and/or the second metal film, which are electrically connected to the external electrodes, include a first portion which has a film thickness of 20 nm or more and is located in proximity to the main body ends which are electrically connected with the external electrodes. The first portion includes a plurality of first grooves extending in the first direction and being in contact with the main body ends. As used herein the term "A and/or B" refers to any one of "A alone", "B alone", and "A and B".

A combination type capacitor according to the disclosure includes: a plurality of film capacitors; and at least one bus bar connecting all of the plurality of film capacitors, the plurality of film capacitors including the film capacitor described above.

An inverter according to the disclosure includes: a bridge circuit including switching elements; and a capacitance member connected to the bridge circuit, the capacitance member including the film capacitor described above.

An electric vehicle according to the disclosure includes: a power supply; the inverter according to the disclosure, connected to the power supply; a motor connected to the inverter; and wheels driven by the motor.

DETAILED DESCRIPTION

Figure 1:
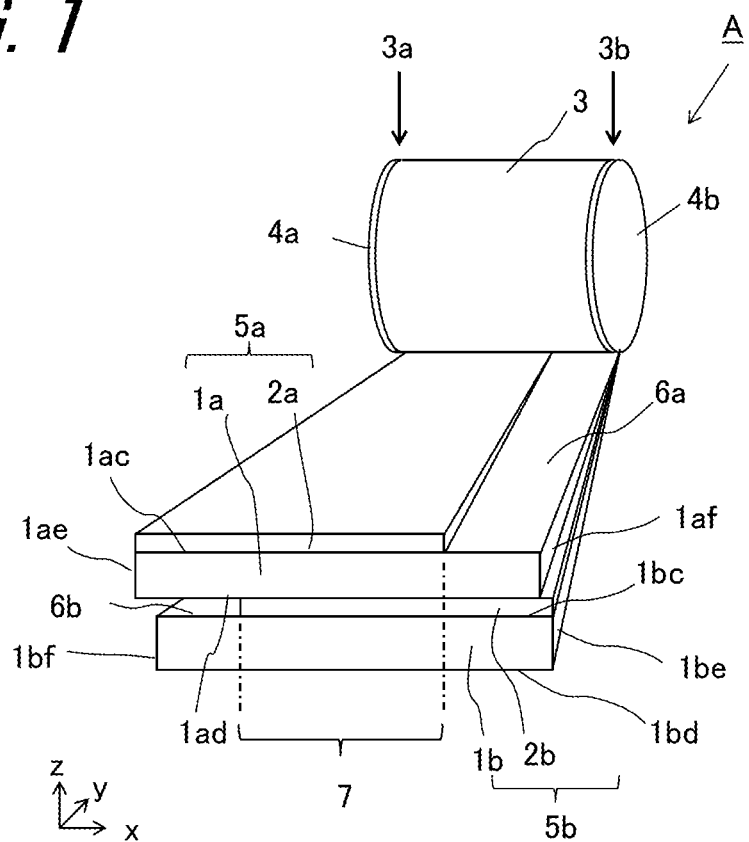
FIG. 1 is a developed perspective view schematically showing a wound type film capacitor.
Figure 2:
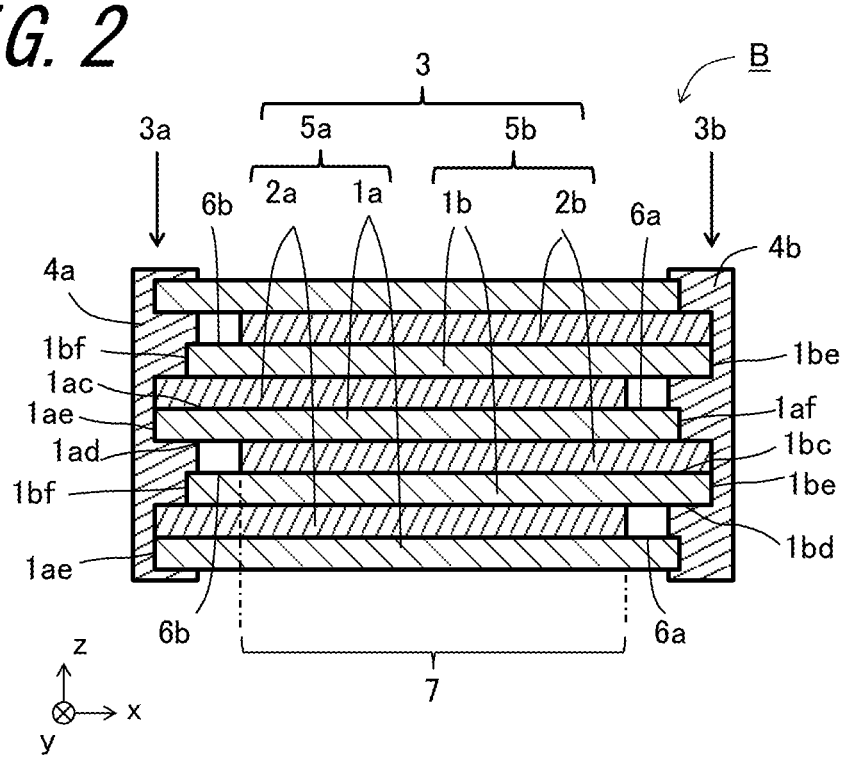
FIG. 2 is a schematic sectional view of a laminated type film capacitor.
Figure 3:
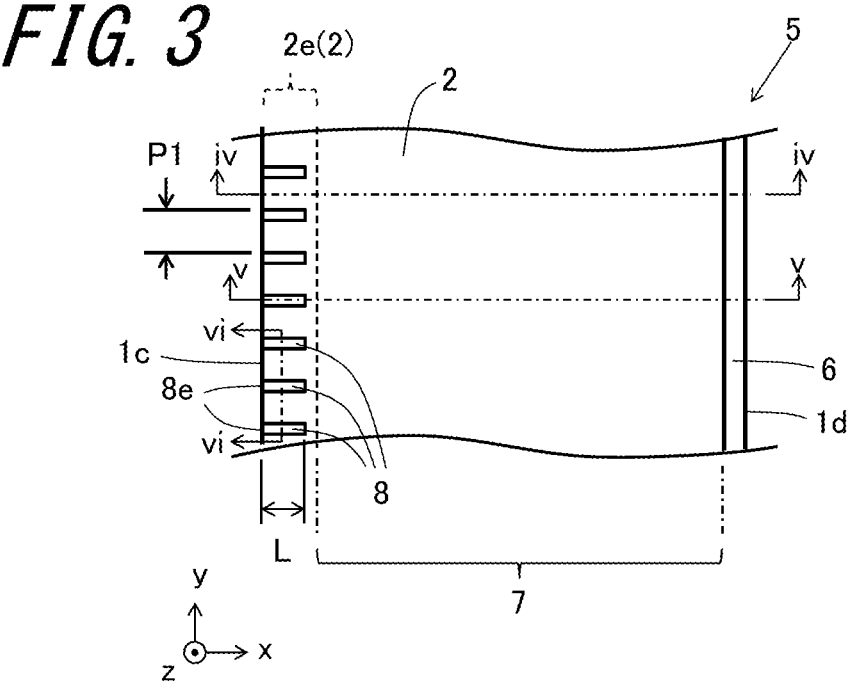
FIG. 3 is a plan view showing the surface of part of a dielectric film and a metal film according to one embodiment.

As shown in FIGS. 1 to 3, a film capacitor includes a film capacitor main body portion 3, which may also be hereinafter called merely "main body portion 3", and a pair of external electrodes 4a and 4b. The main body portion 3 is configured so that a first dielectric film 1a, a second dielectric film 1b, a first metal film 2a, and a second metal film 2b are wound or laminated. The pair of external electrodes 4a and 4b is attached to opposed main body portion 3 ends (main body ends) 3a and 3b, respectively, by means of Metallikon.

In the main body portion 3 of a wound type film capacitor A shown in FIG. 1, there are laminated and wound a first metallized film 5a and a second metallized film 5b, the first metallized film 5a including including the first dielectric film 1a and the first metal film 2a deposited on a first face lac of the first dielectric film 1a, the second metallized film 5b including the second dielectric film 1b and the second metal film 2b deposited on a second face 1bc of the second dielectric film 1b. The first metal film 2a is electrically connected to the external electrode 4a at one main body portion 3 end, i.e., the main body end 3a. The second metal film 2b is electrically connected to the external electrode 4b at the other main body portion 3 end, i.e., the main body end 3b. In the following description, the first dielectric film 1a, the first metal film 2a, and the first metallized film 5a may also be called merely "the dielectric film 1a", "the metal film 2a", and "the metallized film 5a", respectively, with the term "first" omitted. Likewise, the second dielectric film 1b, the second metal film 2b, and the second metallized film 5b may also be called simply "the dielectric film 1b", "the metal film 2b", and "the metallized film 5b", respectively, with the term "second" omitted.

In FIG. 1, to simplify an understanding of the construction, the dielectric film 1a, 1b and the metal film 2a, 2b drawn from the winding are each illustrated as being shaped so that the thickness becomes larger gradually from the rear to the front as viewed in the paper with FIG. 1 printed thereon.

In FIG. 1, the direction of the width of each of the dielectric films 1a and 1b and the metal films 2a and 2b is defined as the first direction x, the direction of the length thereof is defined as the second direction y, and the direction of the thickness thereof is defined as z direction. The first direction x and the second direction y may also be hereinafter called merely "x direction" and "y direction", respectively. The dielectric film 1a, 1b and the metal film 2a, 2b are laminated on top of each other in the z direction. The external electrodes 4a and 4b are disposed at the main body ends 3a and 3b, respectively, of the main body portion 3 aligned in the x direction. In the film capacitor A, the x direction coincides with an axial direction of the winding.

In the main body portion 3 of a laminated type film capacitor B shown in FIG. 2, there are alternately laminated metallized films 5a and metallized films 5b, the metallized films 5a each including the dielectric film 1a and the metal film 2a deposited on a first face lac of the dielectric film 1a, the metallized films 5b each including the dielectric film 1b and the metal film 2b deposited on a second face 1bc of the dielectric film 1b. The metal film 2a is electrically connected to the external electrode 4a at one main body portion 3, i.e., the main body end 3a. The metal film 2b is electrically connected to the external electrode 4b at the other main body portion 3 end, i.e., the main body end 3b.

In each of the film capacitor A and the film capacitor B, the dielectric film 1a includes the first face lac and a third face lad opposed to each other in the z direction, and a first side face 1ae and a second side face 1af opposed to each other in the x direction, and also, the dielectric film 1b includes the second face 1bc and a fourth face 1bd opposed to each other in the z direction, and a first side face 1be and a second side face 1bf opposed to each other in the x direction.

The metallized film 5a is formed by depositing the metal film 2a on the first face lac of the dielectric film 1a. In the metallized film 5a, on a part of the first face lac which is close to the second side face 1af, there is provided an insulation margin 6a in the form of a continuous portion extending in the y direction. The insulation margin 6a is an area where the dielectric film 1a is left bare of the metal film.

The metallized film 5b is formed by depositing the metal film 2b on the second face 1bc of the dielectric film 1b. In the metallized film 5b, on a part of the second face 1bc which is close to the second side face 1bf, there is provided an insulation 6b in the form of a continuous portion extending in the y direction. The insulation 6b is an area where the dielectric film 1b is left bare of the metal film.

As shown in FIGS. 1 and 2, the metallized film 5a and the metallized film 5b are laminated or wound so as to be slightly displaced in relation to each other in the width direction (x direction).

A potential difference between the metal film 2a and the metal film 2b causes capacitance in an effective region 7 where the metal film 2a and the metal film 2b overlap with each other, with the dielectric film 1a or the dielectric film 1b lying between them.

The following description deals with such characteristics of the embodiment as are common to the metallized film 5a and the metallized film 5b of each of the film capacitor A and the film capacitor B, and hence, as shown in FIG. 3, the reference letters "a" and "b" may be omitted from the following description. Moreover, in the sectional views such as FIG. 4, the dimension of each film in the z direction, which is the thickness direction of the film, is shown to an enlarged scale to facilitate explanation of the construction.

It is advisable that, for example, the metal film 2 has a film thickness of 20 nm or less, or a thickness of 5 nm to 15 nm, in particular. The metal film 2 having a film thickness within this range has an area resistance of 18 to 50Ω/□, and thus exhibits self-healing capability. The area resistance may also be referred to as a sheet resistance. Examples of the material used for the metal film 2 include metals such as aluminum (Al) and zinc (Zn), and alloys of such metals.

For example, the film thickness of the metal film 2 may be determined by observation of a section of the ion milling-treated metallized film 5 under a scanning electron microscope (SEM).

Figure 4:
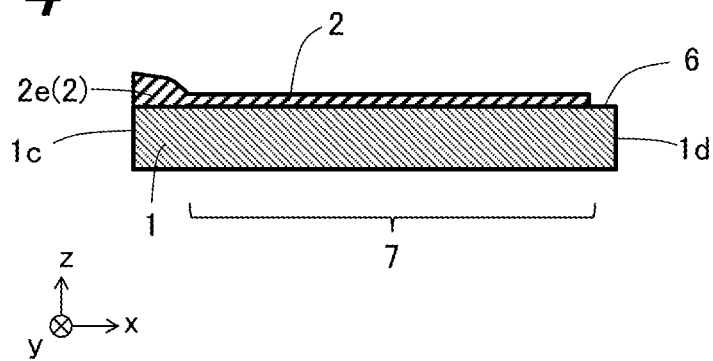
FIG. 4 is a view showing a section taken along the line iv-iv in FIG. 3.
Figure 5:
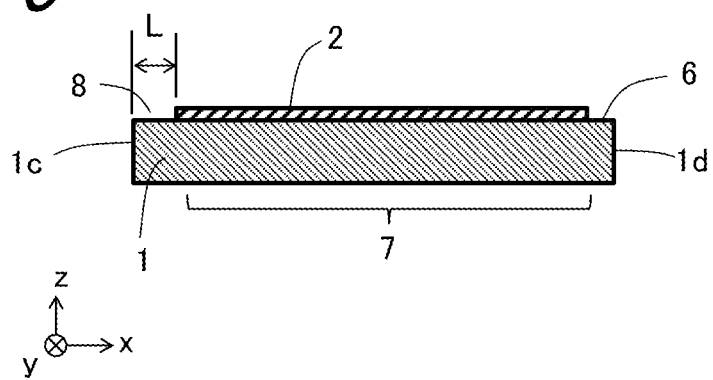
FIG. 5 is a view showing a section taken along the line v-v in FIG. 3.
Figure 6:
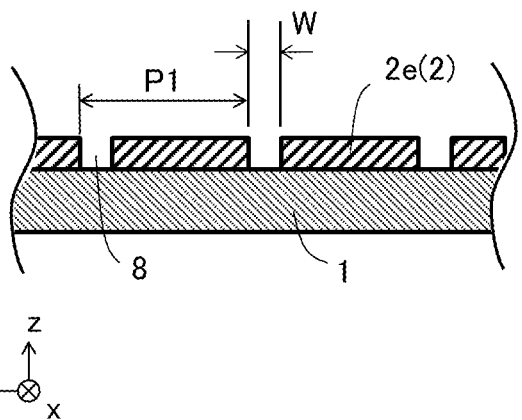
FIG. 6 is a view showing a section taken along the line vi-vi in FIG. 3.

FIG. 3 is a plan view of the metallized film 5. FIG. 4 is a view showing a section of the metallized film 5 taken along the line iv-iv in FIG. 3. FIG. 5 is a view showing a section of the metallized film 5 taken along the line v-v in FIG. 3. FIG. 6 is a view showing a section of the metallized film 5 taken along the line vi-vi in FIG. 3. As shown in FIGS. 3 and 4, the metal film 2 has a so-called heavy edge structure at least at a part (2e) of the metal film 2 which is close to the junction with the external electrode 4. The part of the metal film 2 which is close to the junction with the external electrode 4 refers to the part of the metal film 2 which is close to the first side face 1e of the dielectric film 1. The part 2e of the metal film 2 which is close to the junction with the external electrode 4 may also be hereinafter called "heavy edge portion 2e" or "first portion 2e". For example, the heavy edge structure is a structure in which the part 2e of the metal film 2 which is close to the junction with the external electrode 4 is larger in thickness and lower in electrical resistance than the effective region 7 where the metal film 2a and the metal film 2b overlap with each other. For example, the film thickness of the part 2e of the metal film 2 which is close to the junction with the external electrode 4 may be twice or above the film thickness of the self-healing metal film, or more specifically 20 nm or more. The heavy edge portion 2e of the metal film 2 may have a film thickness ranging downwardly from 80 nm. The placement of the heavy edge portion 2e in the metal film 2 enhances electrical connection between the metal film 2 and the external electrode 4. Moreover, the metal film 2 is electrically connected at its low-resistance heavy edge portion 2e to the external electrode 4, and hence the equivalent series resistance (ESR) of each of the film capacitor A and the film capacitor B can be reduced. In each of the film capacitor A and the film capacitor B, the heavy edge portion 2e of the metallized film 5a may overlap with the insulation margin 6b of the metallized film 5b, and, the heavy edge portion 2e of the metallized film 5b may overlap with the insulation margin 6a of the metallized film 5a. The width of the heavy edge portion 2e in the first direction x is determined in accordance with the size of the film capacitor A, B. For example, the width is 4 mm or less, or may fall in the range of from 0.5 mm to 3 mm.

In the heavy edge portion 2e, the larger film thickness of the metal film 2 leads to a significant influence of difference in thermal shrinkage between the metal film 2 and the dielectric film 1. Consequently, at the end of the metallized film 5, i.e., the main body end 3, warpage may be caused in the metallized film 5 by the thermal shrinkage difference between the metal film 2 and the dielectric film 1. The warpage of the metallized film 5 occurring at the main body end 3 obstructs the entry of Metallikon material into a clearance between the laminated metallized films 5. This reduces the area of contact between the metal film 2 and the external electrode 4, which may result in poor electrical connection between the metal film 2 and the external electrode 4.

In an embodiment according to the disclosure, as shown in FIGS. 3 to 6, the metal film 2 includes a first groove 8 formed in the heavy edge portion 2e so as to extend in the first direction x. The first groove 8, which has an opening 8e through the main body end 3, extends in the first direction x from the opening 8e so as to reach a predetermined length L. The length L of the first groove 8 in the first direction x may be equal to or smaller than the width of the heavy edge portion 2e in the first direction x as shown in FIG. 3. The metal film 2 may include a plurality of the first grooves 8 arranged at a predetermined interval in the second direction y.

The first groove 8 provided in the heavy edge portion 2e lessens the influence of difference in thermal shrinkage between the metal film 2 and the dielectric film 1 at the heavy edge portion 2e, and thus can reduce the occurrence of warpage at the end of the metallized film 5. This allows improvement in the reliability of electrical connection between the metal film 2 and the external electrode 4, provides the film capacitor with a lower dissipation factor, and can suppress dissipation factor increase under the cycle of charge and discharge.

The length L of the first groove 8 in the first direction x may be smaller than or equal to the width of the heavy edge portion 2e, i.e., the first portion 2e in the first direction x. For example, L may fall in the range of 1.0 mm or more and 2.0 mm or less. Fulfillment of the condition where L is greater than 1.0 mm can lessen the influence of difference in thermal shrinkage from the dielectric film 1. Fulfillment of the condition where L is smaller than 2.0 mm avoids that the first groove 8 reaches the effective region 7, and thus can provide adequate capacitance. That is, the metal film 2 within the effective region 7 does not necessarily have to include the first groove 8.

In other words, in a plan of the film capacitor as viewed in the z direction, the first groove 8a of the metallized film 5a may overlap with the margin 6b of the metallized film 5b but may not overlap with the metal film 2b. Moreover, the first groove 8b of the metallized film 5b may overlap with the margin 6a of the metallized film 5a but may not overlap with the metal film 2a. That is, the first groove 8a of the metallized film 5a may not include a portion which overlaps with the metal film 2b, and, the first groove 8 of the metallized film 5b may not include a portion which overlaps with the metal film 2a.

An interval P1 between the first grooves 8 arranged adjacent each other in the second direction y may be 4 mm or less, for example. P1 exceeding 4 mm brings concern about a failure of the lessening of the influence of difference in thermal shrinkage between the metal film 2 and the dielectric film 1. P1 may be set at a smaller value when the heavy edge portion 2e has a relatively large film thickness. On the other hand, P1 may be set at a larger value when the heavy edge portion 2e has a relatively small film thickness. For example, P1 is 1 mm or more, or may be set at a smaller value than that.

Figure 7:
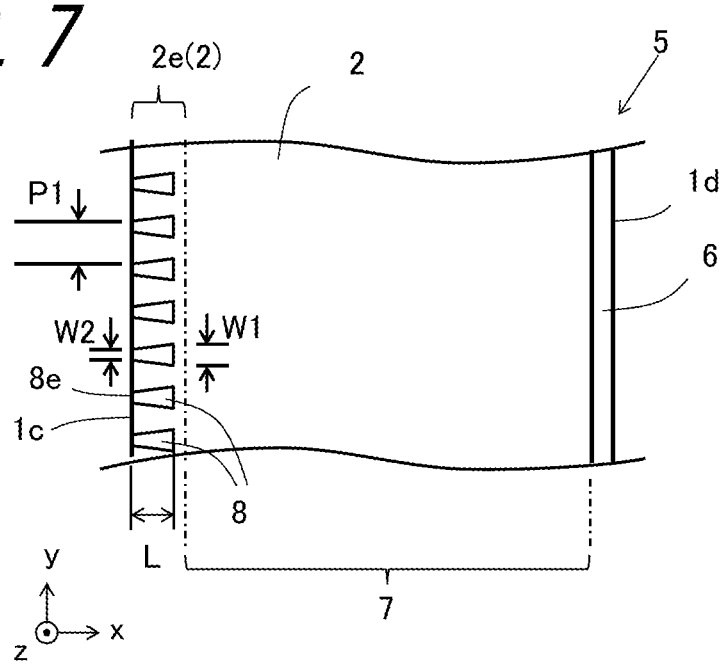
FIG. 7 is a plan view showing the surface of part of the dielectric film and the metal film according to one embodiment.
Figure 8:
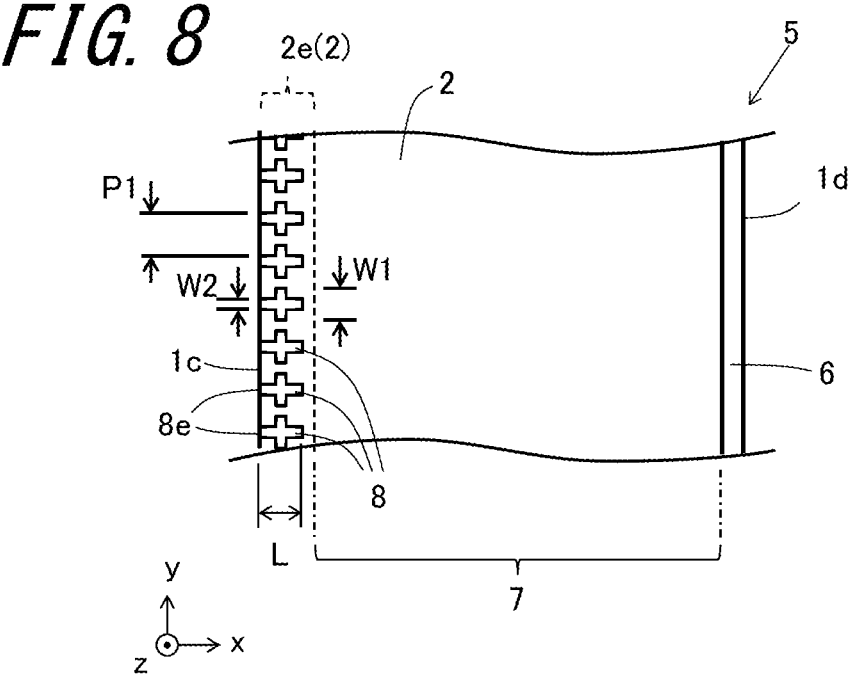
FIG. 8 is a plan view showing the surface of part of the dielectric film and the metal film according to one embodiment.

As shown in FIG. 6, the width of the first groove 8 in the second direction y is represented as W. W1 and W2 may be the same as shown in FIG. 3, in which W1 denotes the maximum width of the first groove 8 and W2 denotes the width of the opening 8e. Alternatively, W1 may be greater than W2, that is; the first groove 8 may be so configured that the opening 8e has a smaller width W2, and the width W is raised to a maximum at a part other than the opening 8e. For example, the first groove 8 may be rectangular shaped as shown in FIG. 3, or may be shaped in a trapezoid having two bottom sides, of which the shorter bottom side corresponds to the opening 8e, and the longer bottom side is opposed to the opening 8e, as shown in FIG. 7. In another alternative, as shown in FIG. 8, the first groove 8 may be shaped in a crisscross defined by two groove segments extending in the first direction x and the second direction y, respectively, in intersecting relation. In this case, the length in the second direction y of the groove segment extending in the second direction y is defined as the maximum width W1.

Moreover, the metal films 2 defining the wall surfaces of the first groove 8 may be in contact at the main body end 3, with the first groove 8 lying between them, as long as the metal films 2 defining the wall surfaces of the first groove 8 are not joined together at the main body end 3. In this case, the first groove 8 may be shaped in a triangle having a vertex at the main body end 3.

The ratio between the width W2 of the opening 8e and the interval P1 between adjacent first grooves 8 is given as W2/P1. The smaller the ratio W2/P1, the greater the area of contact between the metal film 2 and the external electrode 4. For example, W2/P1 may be 0.35 or less.

Fulfillment of the condition where the width W2 of the opening 8e of the first groove 8 is smaller than the maximum width W1 lessens the influence of difference in thermal shrinkage between the metal film 2 and the dielectric film 1, and thus can reduce the occurrence of warpage at the end of the metallized film 5, and can also increase the area of contact between the metal film 2 and the external electrode 4. This allows further improvement in electrical connection between the metal film 2 and the external electrode 4. For example, W1 may fall in the range of 0.1 mm or more and 1.0 mm or less, or may fall in the range of 0.3 mm or more and 0.5 mm or less, in particular. For example, W2 may be 1.0 mm or less, or may be 0.5 mm or less, in particular.

The bottom of the first groove 8 may be of the dielectric film 1. The bottom of the first groove 8 may be of the metal film 2. In the case where the bottom of the first groove 8 is of the metal film 2, the metal film 2 constituting the bottom portion of the first groove 8 is smaller in film thickness than the heavy edge portion 2e.

Figure 9:
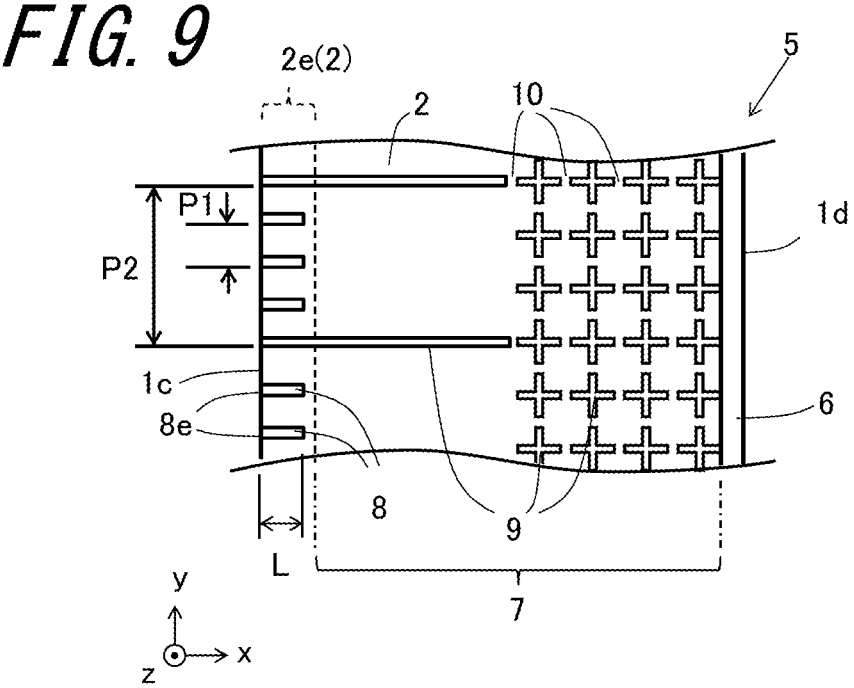
FIG. 9 is a plan view showing the surface of part of the dielectric film and the metal film according to one embodiment.

As shown in FIG. 9, the metal film 2 may include, in addition to the first groove 8, one or a plurality of second grooves 9 located within the effective region 7. The second groove 9 may be kept in contact with an end face 1c of the dielectric film 1 and/or the insulation margin 6. The second groove 9 may extend in the first direction x so as to provide connection between the end face 1c of the dielectric film 1 and the insulation margin 6. A plurality of second grooves 9 may extend in different directions in an intersecting manner so as to divide the metal film 2 into a plurality of subregions. The metal film 2 may include fuse portions 10 which connect together the subregions obtained by division of the metal film 2 by the second grooves 9. In the case where the first portion 2e includes the plurality of second grooves 9, one or more first grooves 8 may be disposed between adjacent second grooves 9. In the first portion 2e, the interval P1 between the first grooves 8 is smaller than an interval P2 between the second grooves 9. Moreover, for example, when the effective region 7 is divided into two regions in the first direction x, one region of the two regions which is adjacent to the insulation margin 6 of the metal film 2 may include the second groove 9, whereas the other region including the heavy edge portion 2e of the metal film 2 may be free of the second groove 9. For example, the second groove 9 may have a width of 0.01 mm to 0.20 mm.

Figure 10:
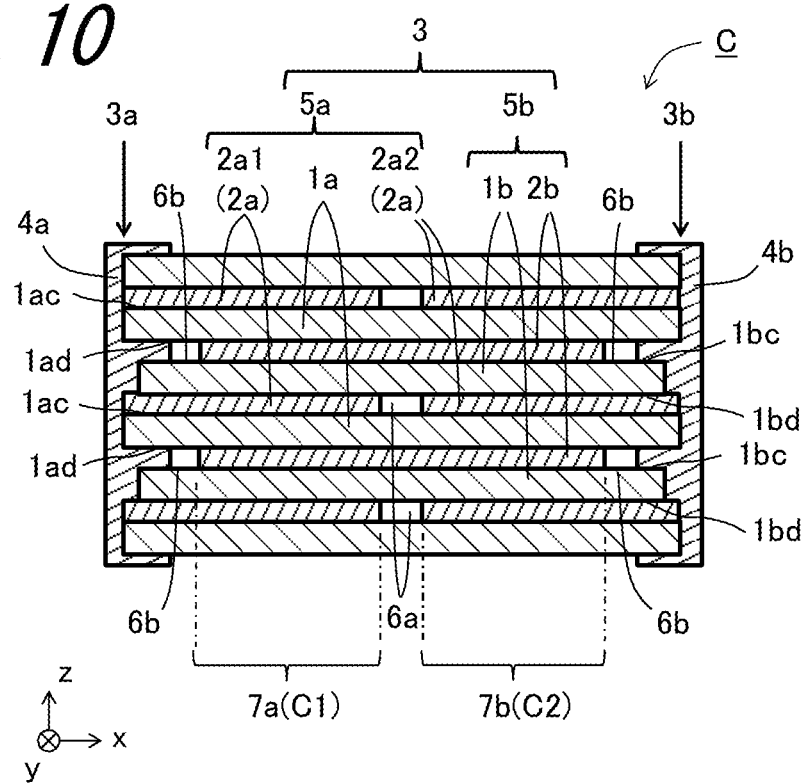
FIG. 10 is a schematic sectional view of a film capacitor according to one embodiment.
Figure 11:
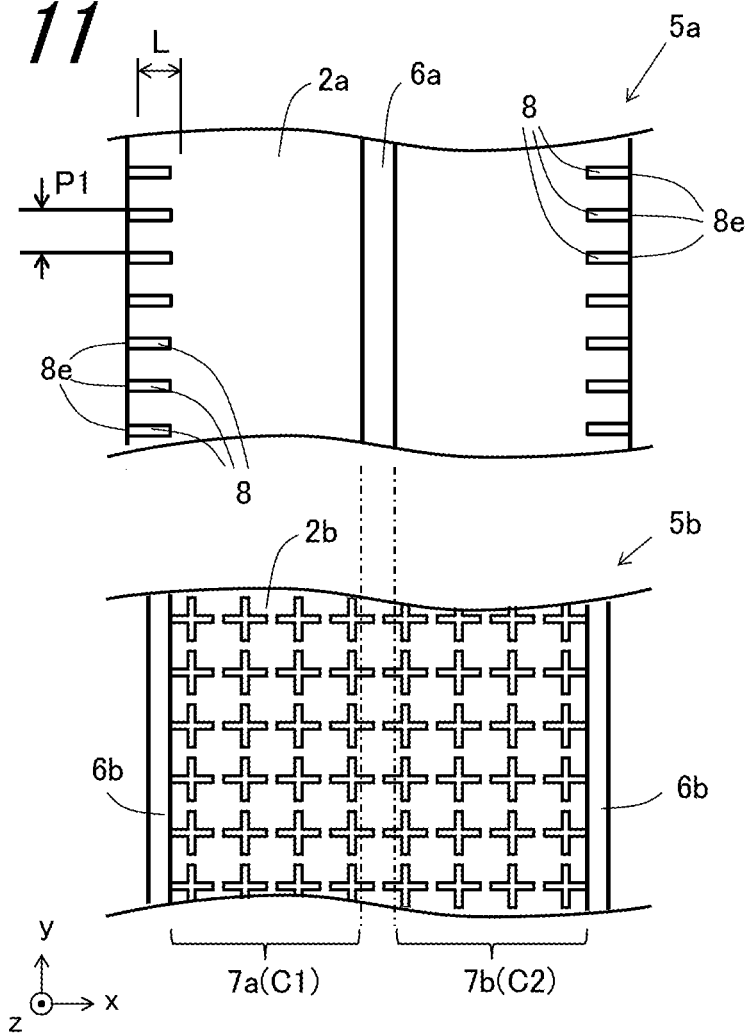
FIG. 11 is a plan view showing the surface of part of the dielectric film and the metal film in FIG. 10.

In the main body portion 3 of a laminated type film capacitor C shown in FIGS. 10 and 11, there are alternately laminated first metallized films 5a and second metallized films 5b, the first metallized films 5a each including the first dielectric film 1a and the first metal film 2a deposited on a first face lac of the first dielectric film 1a, the second metallized films 5b each including the second dielectric film 1b and the second metal film 2b deposited on a second face 1bc of the second dielectric film 1b. Also in FIG. 11, the width direction of each of the first dielectric film 1a, the second dielectric film 1b, the first metal film 2a, and the second metal film 2b is defined as the first direction x, the length direction thereof is defined as the second direction y, and the thickness direction thereof is defined as z direction.

In the film capacitor C, two capacitance sections are connected in series with each other. The metal film 2a includes a left-hand metal film 2a1 and a right-hand metal film 2a2, as viewed in FIG. 11. That is, the metal film 2a includes two metal films 2a1 and 2a2 juxtaposed in the x direction. The metal film 2a1 is electrically connected to the external electrode 4a at the main body end 3a located on the left side of the main body portion 3, and, the metal film 2a2 is electrically connected to the external electrode 4b at the main body end 3b located on the right side of the main body portion 3.

At a central part in the first direction x of the metallized film 5a of the film capacitor C, there is provided a first insulation margin 6a in the form of a continuous portion extending in the second direction y. The first insulation margin 6a is an area where the first face lac is left bare of the metal film 2. The first insulation margin 6a provides electrical isolation between the metal film 2a1 and the metal film 2a2.

At each end in the first direction x of the metallized film 5b of the film capacitor C, there is provided a second insulation margin 6b in the form of a continuous portion extending in the second direction y. The second insulation margin 6b is an area where the second face 1bc is left bare of the metal film 2. The metal film 2b is not electrically connected to either of the external electrode 4a and the external electrode 4b.

As shown in FIG. 11, the dielectric film 1a, 1b and the metal film 2a, 2b are overlapped and laminated in the z direction. In the film capacitor C, a first capacitance section C1 and a second capacitance section C2 are connected in series with each other. The first capacitance section C1 is formed in an effective region 7a where the metal film 2a1 and the metal film 2b are positioned with the dielectric film 1a or the dielectric film 1b sandwiched in between, and, the second capacitance section C2 is formed in an effective region 7b where the metal film 2a2 and the metal film 2b are positioned with the dielectric film 1a or the dielectric film 1b sandwiched in between.

In the effective region 7 (7a, 7b), it is sufficient that one of the laminated metal films 2a (2a1, 2a2) and 2b are given such a film thickness as to provide self-healing capability. For example, the entire metal film 2a of the film capacitor C may be equal in film thickness to the first portion 2e, and, the thickness of the entire metal film 2b may be 20 nm or less. In this case, the metal film 2b enables the film capacitor C to exhibit self-healing capability. For the case of the film capacitor C, as shown in FIG. 11, the metal film 2a may include the first groove 8 alone, and, the second groove 9 may be provided in the metal film 2b.

Such a construction of series connection type may be applied not only to the laminated type film capacitor C shown in FIGS. 10 and 11, but also to a wound type film capacitor.

In the series connection-type construction such as the film capacitor C, the first capacitance section C1 and the second capacitance section C2 are connected in series with each other inside the film capacitor, and hence voltages to be applied to the first capacitance section C1 and the second capacitance section C2 are distributed according to their levels of capacitance. This make it possible to enhance the dielectric strength of the film capacitor C as a whole. The film capacitor A, B may also be hereinafter called "normal film capacitor", and the film capacitor C may also be hereinafter called "series connection-type film capacitor".

Examples of the insulating resin material used for the dielectric film 1 include polypropylene (PP), polyethylene terephthalate (PET), polyphenylene sulfide (PPS), polyethylene naphthalate (PEN), polyarylate (PAR), polyphenylene ether (PPE), polyetherimide (PEI), and cycloolefin polymer (COP). Polyarylate (PAR), in particular, is known for its high breakdown voltage level.

The film capacitors A, B, and C as thus far described may be produced as follows. At first, the dielectric film 1 is prepared. For example, the dielectric film 1 is obtained by applying a resin solution, which is prepared by dissolving an insulating resin in a solvent, to the surface of a base film made of, for example, polyethylene terephthalate (PET), then forming the resulting resin coating into a sheet, and drying the formed sheet until the solvent evaporates. Any known film-forming technique selected from among a doctor blade method, a die coater method, a knife coater method, etc. may be used for the film formation. Examples of the solvent for use in the film formation include methanol, isopropanol, n-butanol, ethylene glycol, ethylene glycol monopropyl ether, methyl ethyl ketone, methyl isobutyl ketone, xylene, propylene glycol monomethyl ether, propylene glycol monomethyl ether acetate, dimethyl acetamide, cyclohexane, and an organic solvent containing a mixture of two or more substances selected from among those given above. Alternatively, a resin film produced by melt extrusion may be drawn into the dielectric film.

For example, the dielectric film 1 may be given a thickness of less than or equal to 5 μm. It is preferred to use the dielectric film 1 having a thickness of 0.5 μm to 4 μm, in particular.

While the dielectric film 1 may be composed solely of the above-described insulating resin, other materials than the above-described insulating resin may additionally be contained in the dielectric film 1. Examples of other constituent elements than the resin that may be contained in the dielectric film 1 include such organic solvents as mentioned above and inorganic fillers. For example, inorganic oxide such as alumina, titanium oxide, or silicon dioxide, or inorganic nitride such as silicon nitride, or glass may be used for the inorganic filler. The use of an inorganic filler made of a material having a high relative permittivity, such as perovskite-structured composite oxide, in particular, improves the relative permittivity of the dielectric film 1 as a whole, and thus allows miniaturization of the film capacitor. Moreover, the inorganic filler may be subjected to surface treatment such as silane coupling treatment or titanate coupling treatment to enhance compatibility between the inorganic filler and the resin.

The dielectric film 1, when containing such an inorganic filler, may be made as a composite film having an inorganic filler content of less than 50% by mass and a resin content of 50% by mass or more. Thus composed, the dielectric film 1 has a greater relative permittivity on the strength of the inorganic filler, while maintaining resin flexibility. Moreover, the inorganic filler may range from 4 nm to 1000 nm in size, for example, average particle size.

A mask is placed on a predetermined area of one face of the dielectric film 1 thus produced. A metal component such as aluminum (Al) is vapor-deposited onto a mask-free part of the one face of the dielectric film 1 to form the metal film 2. The metallized film 5 including the insulation margin 6 is thus obtained.

For the cases of the film capacitor A and the film capacitor B, the predetermined area to be masked refers to one end in the width direction (the first direction x) of the dielectric film. For the case of the film capacitor C, the predetermined to-be-masked area refers to a central part in the width direction (the first direction x) of the first dielectric film 1a, as well as to each end in the width direction (the first direction x) of the second dielectric film 1b.

In forming the heavy edge structure, with a mask placed on the above-described metallized film 5 except for the area where the heavy edge portion is to be formed, for example, zinc (Zn) is vapor-deposited onto the mask-free area of the above-described vapor-deposited metal component. The film thickness of the vapor-deposited film for forming the heavy edge portion 2e may be adjusted to one to three times the film thickness of the above-described vapor-deposited metal component. This makes the film thickness of the heavy edge portion 2e two to four times the film thickness of other area. The first portion 2e is thus obtained.

Next, the first groove 8 is formed in the first portion 2e of the metal film 2. A laser patterning method may be used for the formation of the first groove 8. According to the laser patterning method, a part of the metal film 4 is volatilized by laser using a laser marking machine or a laser trimming machine. Any one of a green laser, a YAG laser, and a $CO_2$ laser may be used for laser.

As shown in FIG. 1 or FIG. 2, the main body portion 3 of the film capacitor A or the film capacitor B is obtained by laminating or winding at least one set of two metallized films 5 (5a, 5b), each including the dielectric film and the metal film 2 (2a, 2b) deposited on one face of the film, the two metallized films being overlapped with each other so as to be slightly displaced in relation to each other in the width direction, i.e., the first direction x. As shown in FIG. 11, the main body portion 3 of the film capacitor C is obtained by laminating or winding at least one set of the metallized film 5a and the metallized film 5b, which are overlapped with each other.

As the external electrodes 4, Metallikon electrodes are formed at end faces in the x direction of the obtained main body portion 3, respectively. The film capacitor A, the film capacitor B, or the film capacitor C is thus obtained. The external electrode 4 may be formed by means of metallic spraying, sputtering, plating, or otherwise.

The outer surface of the main body portion 3 provided with the external electrode 4 may be covered with a non-illustrated exterior member.

Examples of the material for the metal film 2 include metals such as aluminum (Al) and zinc (Zn), and alloys of such metals.

As the material of construction of the Metallikon electrode, it is possible to use at least one metal material selected from among zinc, tin, aluminum, copper, and solder.

Figure 12:
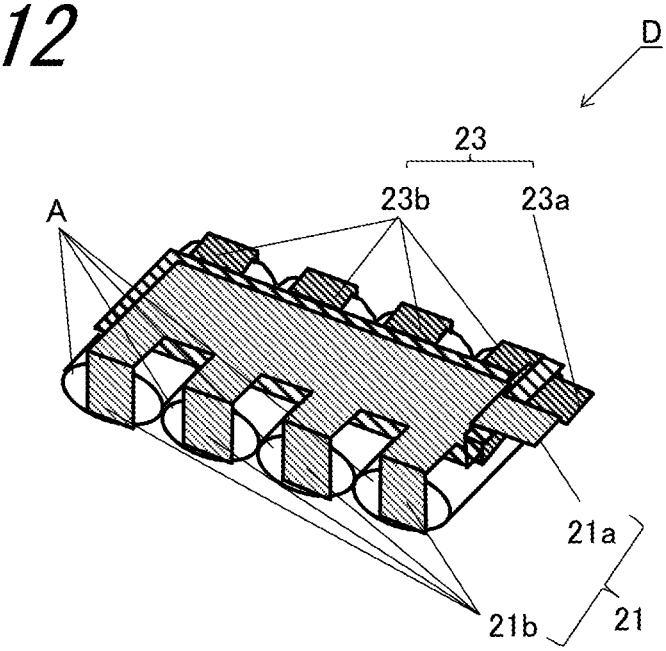
FIG. 12 is a perspective view schematically showing a combination type capacitor.

FIG. 12 is a perspective view schematically showing an embodiment of a combination type capacitor. For ease in understanding the structure of the combination type capacitor, the illustration of a case and an exterior resin for covering capacitor surface is omitted from FIG. 12. The combination type capacitor D includes a plurality of wound type film capacitors A connected in parallel with one another via a pair of bus bars 21 and 23. The bus bar 21 includes a terminal portion 21a for external connection and an extraction terminal portion 21b, and, the bus bar 23 includes a terminal portion 23a for external connection and an extraction terminal portion 23b. The extraction terminal portions 21b and 23b are connected to the external electrodes 4a and 4b, respectively, of the film capacitor A.

The combination type capacitor D, when including the above-described film capacitor A, has a low dissipation factor and suffers little increase in dissipation factor under the cycle of charge and discharge. The combination type capacitor D may include the laminated type film capacitor B or the series connection-type film capacitor C instead of the wound type film capacitor A.

While the combination type capacitor D may include at least one film capacitor A, it may include two or more film capacitors A. The combination type capacitor D is obtained by juxtaposing a plurality of film capacitors A, for example, four film capacitors A as shown in FIG. 12, and thereafter attaching the bus bars 21 and 23, via joining materials, to the external electrodes 4a and 4b, respectively, formed at both ends of the main body portion 3.

The combination type capacitor D may be constructed of either a side-by-side arrangement of film capacitors as shown in FIG. 12 or a stack of film capacitors. Moreover, the film capacitors A may be aligned in a manner such that the positional direction of the external electrodes 4, i.e., the x direction conforms to a vertical direction.

By placing the film capacitor A, or the film capacitor B, or the film capacitor C, or also the combination type capacitor D in a case, and thereafter filling the space in the case with resin, the capacitor can be built as a resin-molded (case-molded) capacitor.

Figure 13:
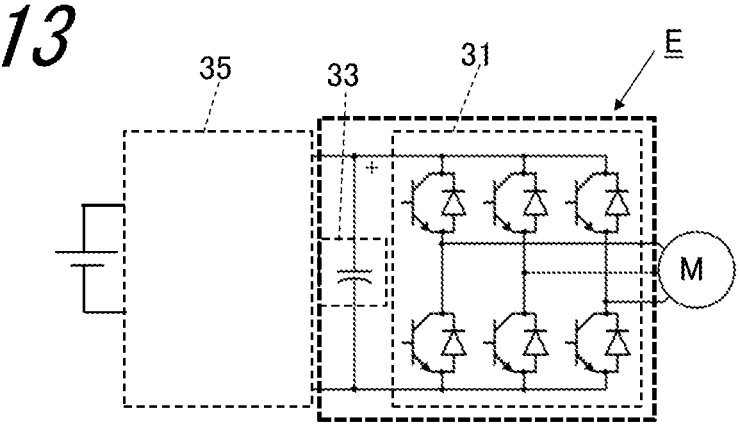
FIG. 13 is a schematic block diagram showing one embodiment of an inverter.

FIG. 13 is a schematic block diagram for explaining an embodiment of an inverter. In FIG. 13, there is shown an inverter E for producing alternating current from direct current as the embodiment. As shown in FIG. 13, the inverter E includes a bridge circuit 31 and a capacitance member 33. For example, the bridge circuit 31 includes switching elements such as IGBTs (Insulated gate Bipolar Transistors) and diodes. The capacitance member 33 is interposed between the input terminals of the bridge circuit 31 for voltage stabilization. The inverter E incorporates the film capacitor A, B, C, or the combination type capacitor D described above as the capacitance section 33.

The inverter E is connected to a booster circuit 35 for boosting DC power voltage. The bridge circuit 31 is connected to a motor generator (motor M) which serves as a drive source.

Figure 14:
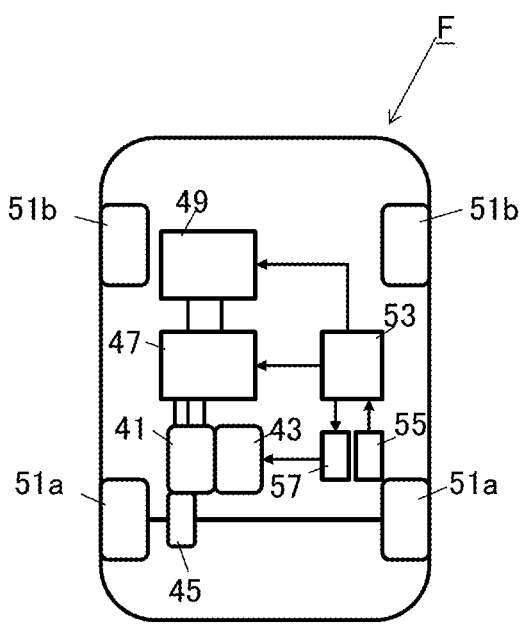
FIG. 14 is a schematic block diagram showing one embodiment of an electric vehicle.

FIG. 14 is a schematic block diagram of an electric vehicle. In FIG. 14, there is shown a hybrid electric vehicle (HEV) as an embodiment of the electric vehicle.

The electric vehicle F includes a drive motor 41, an engine 43, a transmission 45, an inverter 47, a power supply (battery) 49, front wheels 51a, and rear wheels 51b.

The electric vehicle F includes the motor 41 or the engine 43 or both of them serving as a drive source. An output of the drive source is transmitted to a pair of right and left front wheels 51a via the transmission 45. The power supply 49 is connected to the inverter 47, and the inverter 47 is connected to the motor 41.

Moreover, the electric vehicle F shown in FIG. 14 includes a vehicle ECU 53 and an engine ECU 57. The vehicle ECU 53 performs comprehensive control of the entire electric vehicle E. The engine ECU 57 controls a rotation speed of the engine 43 to drive the electric vehicle E. The electric vehicle E further includes driving devices such as an ignition key 55, a non-illustrated accelerator pedal, or a non-illustrated brake, which are operated by a driver or others. Drive signals responsive to the operation of the driving devices by a driver or others are inputted to the vehicle ECU 53. The vehicle ECU 53 outputs instruction signals to the engine ECU 57, the power supply 49, and the inverter 47 as a load based on the drive signals. The engine ECU 57 controls a rotation speed of the engine 43 in response to the instruction signals to drive the electric vehicle E.

An inverter E, i.e., the inverter E including the film capacitor A, B, C, or the combination type capacitor D described above as the capacitance member 33 is used as the inverter 47 of the electric vehicle F. in such an electric vehicle F, the film capacitor A, B, C, or the combination type capacitor D has a low dissipation factor and suffers little increase in dissipation factor under the charge-discharge cycle, this enables capacitance to be maintained for a long period of time, and thus allows long-term reduction of switching noise which occurs in the inverter 47, etc.

The inverter E of the embodiment can be applied not only to the hybrid electric vehicle (HEV) as described above, but also to various power conversion application products such as an electric vehicle (EV), a fuel cell vehicle, an electric bicycle, a power generator or a solar cell.

Examples

A dielectric film, which was on the average 2.5 µm thick, was formed from polyarylate (U-100) manufactured by UNITIKA Ltd. The dielectric film was obtained by dissolving polyarylate in toluene, applying the resulting solution onto a polyethylene terephthalate (PET)-made base material with a coater, forming the resulting coating into a sheet, and then heat-treating the formed sheet at 130° C. to remove toluene. The obtained dielectric film was separated from the base material, and then slit into a 130 mm-wide film.

A series connection-type film capacitor was produced as follows. An Al (aluminum) metal film was formed on one principal face of the dielectric film to constitute a metallized film including two metal films of different film thickness. Hereinafter, one having larger film thickness will be hereinafter referred to as the first metal film, and the other having smaller film thickness will be hereinafter referred to as the second metal film.

The film thickness of the metal film was determined by observation of a section of the ion milling-treated metallized film under a scanning electron microscope (SEM). Table 1 shows a list of film thickness t1 of the first metal film and film thickness t2 of the second metal film. The metal film was evaluated for sheet resistance in accordance with a four-terminal resistance measurement mode using a multimeter. For example, a metal film having a film thickness of 50 nm was found to have a sheet resistance of 7Ω/□, and, a metal film having a film thickness of 30 nm was found to have a sheet resistance of 25 Ω/□.

With use of a green laser marker, a 2 mm-wide first insulation margin was formed at a central part in the first direction x of the first metal film, and, a second insulation margin was formed at each end in the first direction x of the second metal film. The first groove was formed in each end in the first direction x of the first metal film having a larger film thickness, i.e., the first portion. Table 1 shows a list of first groove shape. In the second metal film, the second grooves were formed in a grid-like arrangement in the entire area on the second metal film with a green laser marker. As a pattern formed in the second metal film, the second metal film was divided by the second grooves into subregions each measuring 2 mm by 2 mm, with 0.2 mm-wide fuse portions placed for connecting the subregions together. A laser irradiation conditions were an output of 4 W, a frequency of 140 kHz, and a scan speed of 4 m/sec.

Further, a 130 mm-wide metallized film was slit, and a first metallized film including the first metal film was made as a metallized film which was 28 mm in overall width, with the 2 mm-wide first insulation margin located at a central part in the first direction x thereof. A second metallized film including the second metal film was made as a metallized film which was 27 mm in overall width, with the 1.5 mm-wide second insulation margin located at each end in the first direction x thereof.

The first metallized film and the second metallized film were laminated and wound 100 turns around a 200 mm-diameter drum to obtain a wound body in which a plurality of film capacitors were annularly connected. The first metallized film and the second metallized film were laminated on top of each other so that a single dielectric film was sandwiched between the first metal film and the second metal film.

A normal film capacitor was produced as follows. With an oil mask placed on one face of a 130 mm-wide dielectric film obtained by slitting operation, a 52 mm-wide Al (aluminum) metal film was formed at the center in a width direction, which is the first direction x, of the one face. The Al metal film is on the average 15 nm thick. Subsequently, as a heavy edge portion, a 2 to 8 mm-wide Zn (zinc) metal film was formed at the center in the width direction of the Al metal film using a metal mask. The Zn metal film was on the average 5 to 65 nm thick.

The obtained metallized film was slit at its center and ends in the width direction thereof to obtain first and second metallized films each having a width of 28 mm. Each of the first and second metallized films included a 1 mm-wide insulation margin and a 1 to 4 mm-wide heavy edge portion.

The first grooves were formed in the heavy edge portions, i.e., the first portions of the first and second metal films with a green laser marker. Table 2 shows a list of first groove shape. Moreover, in a part of the area of each of the first and second metal films which is located closer to the insulation margin than the center in the first direction, the second grooves were formed in a grid-like arrangement with a green laser marker to form a pattern defined by subregions of the metal film, each measuring 2 mm by 2 mm, and 0.2 mm-wide fuse portions for connecting the subregions together. A laser irradiation conditions were an output of 4 W, a frequency of 140 kHz, and a scan speed of 4 m/sec.

The first metallized film and the second metallized film were laminated on top of each other so that their respective heavy edge portions were located at opposite ends of the construction in the first direction x, and so that their respective heavy edge portions were each projected by 0.5 mm in the first direction x. The laminated metallized films were wound 100 turns around a 200 mm-diameter drum to obtain a wound body in which a plurality of film capacitors were annularly connected. The first metallized film and the second metallized film were laminated on top of each other so that a single dielectric film was sandwiched between the first metal film and the second metal film.

The obtained wound body was cut so as to have a width of 15 mm in the second direction y to obtain a laminate serving as the main body portion.

A zinc-tin alloy was sprayed onto the end faces in the first direction x of the main body portion to form Metallikon electrodes as the external electrodes. The film capacitor was thus produced.

The dissipation factor (DF) of the resulting film capacitor was determined by measurement using a digital multimeter under the conditions of AC 1V and 1 kHz. The measured dissipation factor value is designated "pre-charge/discharge test dissipation factor DF1".

Each film capacitor was subjected to the following charge-discharge test. After being put on charge at a direct current voltage (DC) of 600 V, the film capacitor was forcibly short-circuited for electrical discharge. With such a sequence of the charging step and the discharging step defined as one charge-and-discharge cycle, the film capacitor received 100 charge-and-discharge cycles as a charge-discharge test. Following the completion of the charge-discharge test, the dissipation factor (DF) of the film capacitor has been measured once again. The measured dissipation factor value is designated "post-charge/discharge test dissipation factor DF2". Table 1 shows a list of DF1 value, DF2 value, and DF2/DF1 value. Note that "DF2/DF1" refers to the ratio of DF2 to DF1.

TABLE 1

| | First metal film | Second metal film | First groove | | | | | | | Charge-discharge test result | | |
|---|---|---|---|---|---|---|---|---|---|---|---|---|
| Sample No. | Film thickness t1 nm | Film thickness t2 nm | Shape | Length L mm | Maximum width W1 mm | Opening width W2 mm | Interval P1 mm | W2/P1 | Bottom | Pre-test dissipation factor DF1 % | Post-test dissipation factor DF2 % | DF2/DF1 |
| 1 | 20 | 15 | No Groove | — | — | — | — | — | — | 0.5 | 0.9 | 1.8 |
| 2 | 20 | 15 | Rectangle | 1 | 0.1 | 0.1 | 1.1 | 0.09 | Film | 0.6 | 0.6 | 1.0 |
| 3 | 20 | 15 | Crisscross | 1.5 | 0.5 | 0.1 | 1.6 | 0.06 | Film | 0.6 | 0.6 | 1.0 |
| 4 | 50 | 30 | No Groove | — | — | — | — | — | — | 0.4 | 0.7 | 1.8 |
| 5 | 50 | 30 | Rectangle | 0.5 | 0.1 | 0.1 | 1.1 | 0.09 | Film | 0.6 | 1 | 1.7 |
| 6 | 50 | 30 | Rectangle | 1 | 0.1 | 0.1 | 1.1 | 0.09 | Film | 0.6 | 0.8 | 1.3 |
| 7 | 50 | 30 | Rectangle | 2.5 | 0.1 | 0.1 | 1.1 | 0.09 | Film | 0.6 | 1 | 1.7 |
| 8 | 50 | 30 | Rectangle | 1.5 | 0.5 | 0.5 | 2 | 0.25 | Film | 0.5 | 0.6 | 1.2 |
| 9 | 50 | 30 | Rectangle | 1 | 1 | 1 | 4 | 0.25 | Film | 0.5 | 0.5 | 1.0 |
| 10 | 50 | 30 | Rectangle | 1 | 1 | 1 | 3 | 0.33 | Film | 0.8 | 1 | 1.3 |
| 11 | 50 | 30 | Rectangle | 1 | 1 | 1 | 2.5 | 0.40 | Film | 1.2 | 1.9 | 1.6 |
| 12 | 50 | 30 | Rectangle | 1 | 1 | 1 | 2 | 0.50 | Film | 2.5 | 3.2 | 1.3 |
| 13 | 50 | 30 | Rectangle | 1 | 1.5 | 1.5 | 5 | 0.30 | Film | 0.8 | 1.3 | 1.6 |
| 14 | 50 | 30 | Crisscross | 1.5 | 0.5 | 0.1 | 1.8 | 0.06 | Film | 0.5 | 0.5 | 1.0 |
| 15 | 50 | 30 | Triangle | 1.5 | 1 | 0 | 1.5 | — | Film | 0.4 | 0.4 | 1.0 |
| 16 | 50 | 30 | Trapezoid | 1.5 | 1 | 0.5 | 2 | 0.25 | Film | 0.5 | 0.5 | 1.0 |
| 17 | 50 | 30 | Rectangle | 1 | 1 | 1 | 4 | 0.25 | Vapor-deposited film | 0.4 | 0.4 | 1.0 |
| 18 | 80 | 30 | No Groove | — | — | — | — | — | — | 0.3 | 0.6 | 2.0 |
| 19 | 80 | 30 | Rectangle | 1 | 1 | 1 | 3 | 0.33 | Film | 0.4 | 0.4 | 1.0 |
| 20 | 80 | 30 | Crisscross | 1.5 | 0.5 | 0.1 | 2 | 0.05 | Film | 0.4 | 0.4 | 1.0 |

TABLE 2

| | First portion | | First groove | | | | | | | Charge-discharge test result | | |
|---|---|---|---|---|---|---|---|---|---|---|---|---|
| Sample No. | Film thickness nm | Width nm | Shape | Length L mm | Maximum width W1 mm | Opening width W2 mm | Interval P1 mm | W2/P1 | Bottom | Pre-test dissipation factor DF1 % | Post-test dissipation factor DF2 % | DF2/DF1 |
| 21 | 20 | 3 | No Groove | — | — | — | — | — | — | 0.5 | 0.9 | 1.8 |
| 22 | 20 | 3 | Rectangle | 1 | 0.1 | 0.1 | 1.1 | 0.09 | Film | 0.5 | 0.6 | 1.2 |

TABLE 2-continued

| | First portion | | | First groove | | | | | | Charge-discharge test result | | |
|---|---|---|---|---|---|---|---|---|---|---|---|---|
| | | | | | Maximum | Opening | | | | Pre-test | Post-test | |
| Sample No. | Film thickness nm | Width nm | Shape — | Length L mm | width W1 mm | width W2 mm | Interval P1 mm | W2/P1 — | Bottom — | dissipation factor DF1 % | dissipation factor DF2 % | DF2/ DF1 — |
| 23 | 20 | 3 | Crisscross | 1.5 | 0.5 | 0.1 | 1.6 | 0.06 | Film | 0.6 | 0.6 | 1.0 |
| 24 | 50 | 1 | No Groove | — | — | — | — | — | — | 0.5 | 0.9 | 1.8 |
| 25 | 50 | 1 | Rectangle | 1 | 0.1 | 0.1 | 1.1 | 0.09 | Film | 0.5 | 0.6 | 1.2 |
| 26 | 50 | 1 | Crisscross | 1.5 | 0.5 | 0.1 | 1.6 | 0.06 | Film | 0.5 | 0.5 | 1.0 |
| 27 | 50 | 3 | No Groove | — | — | — | — | — | — | 0.4 | 0.7 | 1.8 |
| 28 | 50 | 3 | Rectangle | 0.5 | 0.1 | 0.1 | 1.1 | 0.09 | Film | 0.6 | 0.9 | 1.5 |
| 29 | 50 | 3 | Rectangle | 1 | 0.1 | 0.1 | 1.1 | 0.09 | Film | 0.6 | 0.7 | 1.2 |
| 30 | 50 | 3 | Rectangle | 2.5 | 0.1 | 0.1 | 1.1 | 0.09 | Film | 0.6 | 1.0 | 1.7 |
| 31 | 50 | 3 | Rectangle | 1.5 | 0.5 | 0.5 | 2 | 0.25 | Film | 0.5 | 0.6 | 1.2 |
| 32 | 50 | 3 | Rectangle | 1 | 1 | 1 | 4 | 0.25 | Film | 0.5 | 0.5 | 1.0 |
| 33 | 50 | 3 | Crisscross | 1.5 | 0.5 | 0.1 | 1.8 | 0.06 | Film | 0.5 | 0.5 | 1.0 |
| 34 | 50 | 3 | Triangle | 1.5 | 1 | 0 | 1.5 | — | Film | 0.4 | 0.4 | 1.0 |
| 35 | 50 | 3 | Trapezoid | 1.5 | 1 | 0.5 | 2 | 0.25 | Film | 0.5 | 0.5 | 1.0 |
| 36 | 50 | 3 | Rectangle | 1 | 1 | 1 | 4 | 0.25 | Vapor-deposited film | 0.4 | 0.4 | 1.0 |
| 37 | 50 | 4 | No Groove | — | — | — | — | — | — | 0.4 | 0.7 | 1.8 |
| 38 | 50 | 4 | Rectangle | 1 | 1 | 1 | 4 | 0.25 | Film | 0.5 | 0.5 | 1.0 |
| 39 | 80 | 3 | No Groove | — | — | — | — | — | — | 0.3 | 0.6 | 2.0 |
| 40 | 80 | 3 | Rectangle | 1 | 1 | 1 | 3 | 0.33 | Film | 0.4 | 0.5 | 1.3 |
| 41 | 80 | 3 | Crisscross | 1.5 | 0.5 | 0.1 | 2 | 0.05 | Film | 0.4 | 0.4 | 1.0 |

As compared to Sample Nos. 1, 4, 18, 21, 24, 27, 37, and 39 each having no first groove, Sample Nos. 2, 3, 5 through 17, 19, and 20 each having the first groove formed in the end in the first direction of the first metal film having a larger film thickness, i.e., the first portion, as well as Sample Nos. 22, 23, 25, 26, 28 through 36, 38, 40, and 41 each having the first groove formed in the heavy edge portion, i.e., the first portion, suffered less dissipation factor increase after the charge-discharge test. Each of Sample Nos. 3, 14 through 16, 20, 23, 26, 33 through 35, and 41 in which the maximum width W1 of the first groove was greater than the width W2 of the opening, in particular, showed no sign of dissipation factor increase after the charge-discharge test.

REFERENCE SIGNS LIST

A, B, C: Film capacitor
D: Combination type capacitor
E: Inverter
F: Electric vehicle
1, 1a, 1b: Dielectric film
2, 2a, 2b: Metal film
2e: First portion (Heavy edge portion)
3: Main body portion
4, 4a, 4b: External electrode
5, 5a, 5b: Metallized film
7: Effective region
8: First groove
9: Second groove
10: Fuse portion
21, 23: Bus bar
31: Bridge circuit
33: Capacitance member
35: Booster circuit
41: Motor
43: Engine
45: Transmission
47: Inverter
49: Power supply
51a: Front wheel
51b: Rear wheel
53: Vehicle ECU
55: Ignition key
57: Engine ECU

The invention claimed is:

1. A film capacitor, comprising:
a main body portion comprising at least, a first metallized film comprising a first dielectric film and a first metal film disposed on a first face of the first dielectric film, and a second metallized film comprising a second dielectric film and a second metal film disposed on a second face of the second dielectric film; and
a pair of external electrodes,
the first dielectric film or the second dielectric film being located between the first metal film and the second metal film,
the external electrodes being disposed on a pair of main body ends in a first direction of the main body portion so as to be electrically connected with the first metal film or the second metal film,
the first metal film and/or the second metal film comprising a first portion which has a film thickness of 20 nm or more and is located in proximity to the main body ends which are electrically connected with the external electrodes,
the first portion comprising a first groove extending in the first direction and being in contact with corresponding one of the main body ends,
wherein W1 is greater than W2, in which W denotes a width of the first groove in a second direction thereof which is perpendicular to the first direction, W1 denotes a maximum value of W, and W2 denotes a width of a part of the first groove which is in contact with corresponding one of the main body ends.

2. The film capacitor according to claim 1,
wherein the first metal film comprises the first groove, and in a plan view of the first metallized film and the second metallized film as viewed in a thickness direction thereof, there is no area where the first groove of the first metal film and the second metal film overlap with each other.

3. The film capacitor according to claim 1, wherein a length in the first direction of the first groove is smaller than or equal to a width in the first direction of the first portion.

4. The film capacitor according to claim 1, wherein the first groove comprises a bottom which is positioned in a thickness direction of the first metallized film and/or the second metallized film, and comprises the first metal film or the second metal film.

5. The film capacitor according to claim 1, wherein the first groove comprises a bottom which is positioned in a thickness direction of the first metallized film and/or the second metallized film, and comprises the first dielectric film or the second dielectric film.

6. The film capacitor according to claim 1, wherein the second metal film comprises the first groove, and in a plan view of the first metallized film and the second metallized film as viewed in a thickness direction thereof, there is no area where the first groove of the second metal film and the first metal film overlap with each other.

7. The film capacitor according to claim 1, wherein the first metallized film comprises a first insulation margin located at a central part in the first direction of the first face, the second metallized film comprises a second insulation margin located at both ends in the first direction of the second face, the first insulation margin and the second insulation margin are free of the first metal film and the second metal film and continuously extend in the second direction perpendicular to the first direction, the first metal film is located on both sides in the first direction of the first insulation margin, and is electrically connected to corresponding one of the external electrodes at corresponding one of the main body ends, and the second metal film is not electrically connected to either of the pair of external electrodes.

8. The film capacitor according to claim 7, wherein t1 is greater than t2, in which t1 denotes a thickness of the first metal film, and t2 denotes a thickness of the second metal film.

9. The film capacitor according to claim 8, wherein a ratio of t1 to t2 (t1/t2) falls in a range of from 2 to 4.

10. A combination type capacitor, comprising:
a plurality of film capacitors; and
at least one bus bar electrically connecting all of the plurality of film capacitors,
the plurality of film capacitors comprising the film capacitor according to claim 1.

11. An inverter, comprising:
a bridge circuit comprising switching elements; and
a capacitance member connected to the bridge circuit,
the capacitance member comprising the film capacitor according to claim 1.

12. An electric vehicle, comprising:
a power supply;
the inverter according to claim 11, connected to the power supply;
a motor connected to the inverter; and
wheels driven by the motor.

13. A film capacitor, comprising:
a main body portion comprising at least, a first metallized film comprising a first dielectric film and a first metal film disposed on a first face of the first dielectric film, and a second metallized film comprising a second dielectric film and a second metal film disposed on a second face of the second dielectric film; and
a pair of external electrodes,
the first dielectric film or the second dielectric film being located between the first metal film and the second metal film,
the external electrodes being disposed on a pair of main body ends in a first direction of the main body portion so as to be electrically connected with the first metal film or the second metal film,
the first metal film and/or the second metal film comprising a portion which has a film thickness of 5 to 15 nm, and a first portion which has a film thickness of 20 nm or more and is located in proximity to the main body ends which are electrically connected with the external electrodes,
the first portion comprising a first groove extending in the first direction and being in contact with corresponding one of the main body ends,
wherein the first metal film comprises the first groove, and
in a plan view of the first metallized film and the second metallized film as viewed in a thickness direction thereof, there is no area where the first groove of the first metal film and the second metal film overlap with each other.

* * * * *